United States Patent Office 3,598,690
Patented Aug. 10, 1971

3,598,690
TIRE CORD ADHESIVE
Arthur C. Danielson, Royal Oak, Mich., assignor to Uniroyal, Inc., New York, N.Y.
No Drawing. Filed Nov. 21, 1967, Ser. No. 684,645
Int. Cl. B29h 17/28
U.S. Cl. 161—144         9 Claims

ABSTRACT OF THE DISCLOSURE

This invention relates to the method of bonding a vulcanized rubber composition to a textile material and the laminate produced. Particular adhesive enhancing ingredients are added to the rubber before vulcanization to produce a better bond between the vulcanized rubber and the textile material.

---

In certain rubber articles designed to withstand considerable stresses in use, the rubber is reinforced with plies of comparatively inextensible textile materials. Thus, rubber hose, belts and tires are commonly reinforced with filamentary textiles in the form of yarns, cords or fabric. In such articles, it is important that the plies of textile reinforcing material be firmly adhered to the rubber intermediate the textile plies and remain effectively adhered even after the article has been subjected to repeated varying strains in use, because any separation and relative movement of the rubber and textile parts leads to abrasion between these parts and consequent failure. In order to improve the adhesion of the textile material to the rubber intermediate the textile plies, it is common practice to first apply a deposit of rubber on the textile material, such as a tire cord fabric, by passing the textile material through a bath of an aqueous dispersion of rubber, such as a rubber latex composition, as in a so-called "solutioning" treatment, and drying. The rubber latex "solutioning" composition preferably contains a resin, e.g., a fusible partially reacted resorcinol-formaldehyde resin, such as a condensate of resorcinol and formaldehyde in the ratio of 1 mole of resorcinol to about 0.5 to 0.8 mole of formaldehyde, and formaldehyde or a formaldehyde-yielding agent which on subsequent heating as during vulcanization of the rubber intermediate the textile plies cures the fusible resin to an infusible state.

According to one aspect of the present invention, there is obtained a further improvement in adhesion of the textile material to the rubber intermediate the textile plies in addition to that obtained by the latex "solutioning" treatment of the textile material. Also, improved adhesion can be obtained between rubber and untreated textile material.

In carrying out the present invention, adhesion of the textile material, which may be bare (so-called grey) or which may be latex "solutioned," to the rubber layers intermediate the textile plies is greatly improved by incorporating in the solid rubber intermediate the textile plies a nitroamine, as hereinafter defined, and a resorcinol-type compound, viz., resorcinol or other meta disubstituted benzenes in which each of the substituents is an OH, NH$_2$ or OCOCH$_3$ radical (e.g. m-aminophenol, m-phenylenediamine, resorcinol monoacetate, resorcinol diacetate), or 1,5 naphthalenediol, or a fusible partially reacted resorcinol-formaldehyde resin (condensate of resorcinol and formaldehyde in the ratio of one mole of resorcinol to about 0.5 to 0.8 mole of formaldehyde), or a condensation product of resorcinol and acetone (condensate of reosrcinol and acetone in the ratio of one mole of resorcinol to about 0.5 to 2 moles of acetone), or a condensation product of resorcinol and acetaldehyde (condensate of resorcinol and acetaldehyde in the ratio of one mole of resorcinol to about 0.5 to 1 mole of acetaldehyde). Such fusible partially reacted resorcinol-formaldehyde resins and those used in the above mentioned latex "solutioning" compositions may be prepared in known manner by heating a concentrated aqueous solution of the resorcinol and formaldehyde, with or without a catalyst such as oxalic acid. The ball and ring softening point (ASTM designation E28–58T) of such fusible partially reacted resins will generally be from about 60° C. to 120° C. Such resorcinol-acetone condensates, which are white powders, may be prepared in known manner by reacting the acetone and resorcinol in dilute hydrochloric acid solution at temperatures from 35° C. to 50° C. for several hours. Such resorcinol-acetaldehyde condensates, which are tacky reddish oils, may be prepared in known manner by reacting the acetaldehyde and resorcinol in dilute oxalic acid solution at 100° C., for several hours.

The nitroamines useful in the invention all have a nitro carbon bonded to an amino methyl carbon and may be represented by the following formulas:

(1) 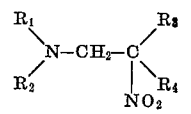

(2) 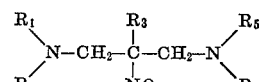

and (3) 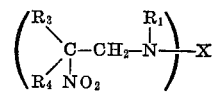

wherein R$_1$ and R$_5$ are hydrogen, aliphatic or aromatic groups having 1 to 18, preferably 1 to 8, carbon atoms, R$_2$ and R$_6$ are aliphatic or aromatic groups having 1 to 18, preferably 1 to 8, carbon atoms and R$_3$ and R$_4$ are hydrogen, or an aliphatic group having 1 to 18, preferably 1 to 6, carbon atoms. Additionally, R$_1$ and R$_2$, and R$_5$ and R$_6$ may be joined together to form a saturated heterocyclic ring with the nitrogen atoms, and R$_3$ and R$_4$ may be joined together to form a saturated homocyclic or heterocyclic ring. Such groups have from 3 to 8 members and include the pyrrolidine, oxazolidine, tetrahydro-1,3,4-oxadiazole, dihydro-1,2,3-dioxazole, piperidine, piperazine, morpholine and cycloalkyl rings. X is an alkylene group containing 1 to 8 carbon atoms. Examples of the aliphatic groups are alkyl, haloalkyl, hydroxyalkyl, dialkylaminoalkyl, alkoxyalkyl, aralkyl, alkenyl, aryl. Examples of the aromatic groups are aryl, alkaryl, and carboxyaryl.

Of the aforesaid nitroamines certain of these are new compositions of matter, namely, those wherein R$_1$ or R$_1$ and R$_2$ are tertiary alkyl groups having from 4 to 18 carbon atoms. These groups are, for example, tertiary-butyl or tertiary octyl groups. Such compounds are particularly useful for incorporation into rubber because of their ease of dispersion in the rubber stock.

The preparation of these type compounds is well known in the art. See specifically, Murrary Senkus, JACS, 68, 10 (1946); Hal G. Johnson, JACS, 68, 12 (1946); and Hal G. Johnson, JACS, 68, 14 (1946).

The rubber intermediate the textile plies may be applied in the usual manner by calendering a coating of a solid vulcanizable rubber composition containing the nitroamines and the resorcinol-type compound on the textile material, generally on both sides, e.g., as in the conventional coating of tire cord fabric with tire carcass stock. Both ingredients may be mixed with the conventional compounding ingredients in the solid rubber in a Banbury mixer and the rubber composition then calendered on the textile material. After building the rubber-coated textile material into the finished article, e.g., a tire, the assembly is heated to vulcanize the rubber components thereof. The ratio of the two compounds is not critical and generally will be from 0.4 to 4 parts of nitroamine per part of the resorcinol-type compound. The amount of the two compounds mixed with the rubber is not critical. Generally 0.5 to 8 parts, and preferably 1 to 4 parts, of the nitroamine and the resorcinol-type compound (total) per 100 parts of the rubber will be mixed in the rubber compound to be calendered on the textile material. Where the textile material is passed through a rubber latex "solutioning" bath and dried, the deposit on the thus treated textile material will be in the range of 1 to 15 percent, preferably 2 to 10 percent, of latex solids based on the weight of the textile material.

The solid rubber used in the present invention for making the rubber and fabric laminates for use in tire manufacture and for other purposes may be natural (Hevea) rubber or conjugated diolefine polymer synthetic rubber or mixtures of any of them including their reclaims. The aqueous dispersion of rubber, when used for "solutioning" the textile material before plying with the solid rubber composition, may be natural rubber latex, or a latex of conjugated diolefine polymer synthetic rubber, or mixture thereof, or an aqueous dispersion of reclaim from such rubbers, or mixtures of any of such latices and reclaim dispersions. Such conjugated diolefine polymer synthetic rubbers are polymers of butadienes-1,3, e.g. butadiene-1,3, isoprene, 2,3-dimethyl-butadiene-1,3, and copolymers of mixtures thereof, and copolymers of mixtures of one or more such butadienes-1,3, with one or more other polymerizable compounds which are capable of forming rubbery copolymers with butadienes-1,3, for example, up to 60% by weight of such mixture of one or more monoethylenic compounds which contain a $CH_2=C<$ group where at least one of the disconnected valences is attached to an electronegative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone. Examples of such conjugated diolefine polymer synthetic rubbers are polybutadiene, polyisoprene, butadiene-styrene copolymers (SBR) and butadiene-acrylonitrile copolymers. The rubber intermediate the plies will also contain conventional compounding and vulcanizing ingredients such as carbon black, rubber processing or softening oils which may be added as such or may be present from oil-extended rubbers, antioxidants, sulfur, zinc oxide and accelerators. The textile material may be any of the conventional textiles used for reinforcing rubber, such as native cellulose (e.g. cottons), regenerated cellulose (e.g. rayons), synthetic linear polyamides (e.g. nylons), and polyesters (e.g. poly(ethylene terephthalate)), and may comprise cords or woven fabrics.

The following examples illustrate the invention. All parts and percentages referred to herein are by weight.

EXAMPLE 1

A rubber compound was prepared by mixing 100 parts of natural rubber, 33 parts of carbon black, 10 parts of zinc oxide, 2 parts of stearic acid, 5 parts of pine tar softener, 1.5 parts of antioxidant BLE (condensation product of acetone and diphenylamine), 0.4 part of accelerator SNS (N-tertiary-butyl-2-benzothiazole-sulfenamide), and 3.5 parts of sulfur.

Additionally, various nitroamines and resorcinol-type compounds were added as indicated in the tables which follow.

Control rubber compounds were prepared similarly to the above compound except the resorcinol-type compound and the nitroamine were omitted.

The adhesion of the rubber compounds and the controls to bare (grey) tire cords made of rayon, nylon and polyester fibers was measured at 250° F. by the "H" adhesion test described in Ind. Rub. World, vol. 114, page 213 (1946) "Study of the "H" Test for Evaluating the Adhesive Properties of Tire Cord in Natural and GR-S Rubbers" and in ASTM designation D2138-62T. In this test, the cord under test coated with the rubber compound under test is embedded in two separate standard rubber blocks and the assembly vulcanize. The pounds necessary to pull the adhered cord free of one of the rubber blocks is the "H" adhesion value. The higher the figure, the better the adhesion of the rubber coating to the cord. Test pieces for the rubber compounds and the controls were vulcanized 30 minutes at 307° F. The grey controls average 3.3 lbs. for rayon, 4.0 lbs. for nylon, and 2.9 lbs. for the polyester.

Table I illustrates the results obtained with the nitroamines having the formula

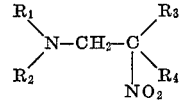

where $R_1$, $R_2$, $R_3$ and $R_4$ are as previously defined:

TABLE I

| Reactants | Parts | Grey cord 250° F. "H" adhesion (lbs.) | | |
| --- | --- | --- | --- | --- |
| | | Rayon | Nylon | Dacron |
| N-(2-nitroisobutyl)methylamine | 1.65 | | | |
| Resorcinol | 1.25 | 9.0 | 7.8 | 3.5 |
| m-Aminophenol | 1.25 | 11.5 | 12.0 | 3.6 |
| m-Phenylenediamine | 1.25 | 8.0 | 5.5 | 3.3 |
| N-(2-nitroisobutyl)ethylamine | 1.82 | | | |
| Resorcinol | 1.25 | 8.5 | 7.4 | 3.8 |
| m-Aminophenol | 1.25 | 11.4 | 12.9 | 4.1 |
| Resorcinol monoacetate | 1.72 | 8.3 | 8.8 | 4.5 |
| N-(2-nitroisobutyl)isopropylamine | 2.00 | | | |
| Resorcinol monobenzoate | 2.43 | 4.6 | 5.0 | 3.5 |
| Resorcinol | 1.25 | 8.7 | 8.9 | 4.1 |
| Resorcinol monacetate | 1.73 | 8.9 | 7.7 | 4.9 |
| Resorcinol-acetone condensation product | 2.00 | 7.3 | 5.1 | 6.3 |
| m-Phenylenediacetate | 2.20 | 5.6 | 5.6 | 3.8 |
| m-Aminophenol | 1.25 | 12.0 | 14.4 | 5.0 |
| m-Phenylenediamine | 1.25 | 10.4 | 8.7 | 3.9 |
| A partially reacted resorcinol-formaldehyde resin | 2.00 | 7.3 | 6.0 | 3.9 |
| 1,5-naphthalenediol | 2.00 | 8.5 | 7.8 | 5.2 |
| N-(2-nitroisobutyl)n-propylamine | 2.00 | | | |
| Resorcinol | 1.25 | 8.5 | 7.5 | 4.9 |
| Resorcinol monoacetate | 1.72 | 10.0 | 8.8 | 5.8 |
| m-Aminophenol | 1.25 | 12.0 | 11.9 | 5.0 |

TABLE I—Continued

| Reactants | Parts | Grey cord 250° F. "H" adhesion (lbs.) | | |
|---|---|---|---|---|
| | | Rayon | Nylon | Dacron |
| N-(2-nitroisobutyl)n-butylamine | 2.17 | | | |
| Resorcinol | 1.25 | 9.3 | 9.6 | 5.4 |
| m-Aminophenol | 1.25 | 14.2 | 16.1 | 4.3 |
| 1,5-naphthalenediol | 2.00 | 8.4 | 9.8 | 5.9 |
| N-(2-nitroisobutyl)isobytylamine | 2.17 | | | |
| Resorcinol | 1.25 | 9.3 | 12.9 | 4.7 |
| m-Aminophenol | 1.25 | 13.8 | 14.2 | 3.9 |
| 1,5-naphthalenediol | 2.00 | 9.1 | 10.1 | 5.9 |
| N-(2-nitroisobutyl)t-butylamine | 2.17 | | | |
| Resorcinol | 1.25 | 7.0 | 6.5 | 4.2 |
| m-Aminophenol | 1.25 | 13.8 | 12.3 | 4.8 |
| m-Phenylenediamine | 1.25 | 11.8 | 8.5 | 4.4 |
| N-(2-nitroisobutyl)cyclohe ylamine | 2.50 | | | |
| Resorcinol | 1.25 | 9.7 | 8.0 | 5.3 |
| m-Aminophenol | 1.25 | 9.9 | 10.6 | 4.4 |
| Resorcinol monoacetate | 1.72 | 9.3 | 9.1 | 5.9 |
| N-(2-nitroisobutyl)t-octylamine | 3.22 | | | |
| Resorcinol | 1.25 | 11.7 | 10.8 | 4.6 |
| m-Aminophenol | 1.25 | 13.6 | 15.7 | 4.5 |
| Resorcinol monoacetate | 1.72 | 10.1 | 10.7 | 4.4 |
| N-(2-nitroisobutyl)benzylamine | 2.60 | | | |
| Resorcinol | 1.25 | 11.1 | 9.8 | 5.4 |
| Resorcinol monoacetate | 1.72 | 10.8 | 11.8 | 6.9 |
| m-Aminophenol | 1.25 | 12.4 | 14.1 | 5.9 |
| N-(2-nitroisobutyl)allylamine | 1.98 | | | |
| Resorcinol | 1.25 | 8.5 | 8.6 | 4.7 |
| Resorcinol monoacetate | 1.72 | 9.1 | 10.3 | 4.6 |
| m-Aminophenol | 1.25 | 12.9 | 15.4 | 4.6 |
| N-(2-nitroisobutyl)aniline | 2.42 | | | |
| Resorcinol | 1.25 | 5.8 | 6.8 | 3.5 |
| Resorcinol monoacetate | 1.73 | 5.2 | 5.7 | 4.0 |
| Resorcinol-acetone condensation product | 2.00 | 3.9 | 3.9 | 3.4 |
| N-(2-nitroisobutyl)-p-aminobenzoic acid | 3.45 | | | |
| Resorcinol | 1.25 | 5.5 | 4.4 | 5.5 |
| Resorcinol monoacetate | 1.72 | 5.2 | 3.5 | 5.7 |
| N-(2-nitroisobutyl)β-methoxyethylamine | 2.50 | | | |
| Resorcinol | 1.25 | 11.4 | 12.0 | 6.0 |
| m-Aminophenol | 1.25 | 14.5 | 14.4 | 5.8 |
| 1,5-naphthalenediol | 2.00 | 10.7 | 11.0 | 6.6 |
| N-(2-nitroisobutyl) 3-methoxy propylamine | 2.70 | | | |
| Resorcinol | 1.25 | 11.0 | 13.3 | 4.8 |
| Resorcinol monoacetate | 1.72 | 9.5 | 11.5 | 5.2 |
| m-Aminophenol | 1.25 | 12.3 | 17.9 | 4.2 |
| N-(2-nitroisobutyl)3-isopropoxypropylamine | 3.10 | | | |
| Resorcinol | 1.25 | 10.9 | 12.0 | 5.3 |
| Resorcinol monoacetate | 1.72 | 10.7 | 12.3 | 5.2 |
| m-Aminophenol | 1.25 | 12.7 | 16.4 | 4.7 |
| N-(2-nitroisobutyl)ethanolamine (not dist.) | 2.25 | | | |
| Resorcinol | 1.25 | 14.2 | 10.7 | 7.0 |
| m-Aminophenol | 1.25 | 14.7 | 13.2 | 5.7 |
| Resorcinol monoacetate | 1.72 | 12.4 | 15.4 | 6.4 |
| N-(2-nitroisobutyl)2-amino-2-methyl-1-propanol | 2.70 | | | |
| Resorcinol | 1.25 | 10.6 | 7.5 | 5.2 |
| Resorcinol monoacetate | 1.72 | 9.9 | 9.0 | 5.5 |
| m-Phenylene diacetate | 2.20 | 12.0 | 10.1 | 5.1 |
| N-(2-nitroisobutyl)2-amino-2-methyl propanol | 2.80 | | | |
| m-Aminophenol | 1.25 | 8.3 | 6.9 | 5.2 |
| 1,5-naphthalenediol | 2.00 | 7.4 | 6.0 | 6.4 |
| N-(2-nitroisobutyl)trimethylol aminomethane | 3.10 | | | |
| m-Aminophenol | 1.25 | 6.6 | 6.3 | 5.4 |
| 1,5-naphthalenediol | 2.00 | 6.1 | 4.9 | 5.5 |
| N-(2-nitroisobutyl)3-dimethylaminopropylamine | 2.85 | | | |
| Resorcinol monoacetate | 1.72 | 9.0 | 7.6 | 6.1 |
| m-Aminophenol | 1.25 | 11.7 | 10.6 | 5.4 |
| N-(2-nitroisobutyl)diethylamine | 2.18 | | | |
| Resorcinol | 1.25 | 7.6 | 6.9 | 4.1 |
| Resorcinol monoacetate | 1.72 | 9.5 | 8.3 | 6.0 |
| m-Aminophenol | 1.25 | 12.5 | 13.4 | 4.3 |
| N-(2-nitroisobutyl)di-n-propylamine | 2.85 | | | |
| Resorcinol | 1.25 | 11.2 | 14.6 | 4.0 |
| m-Aminophenol | 1.25 | 12.9 | 14.1 | 3.9 |
| Resorcinol monoacetate | 1.72 | 10.4 | 14.7 | 5.6 |
| N-(2-nitroisobutyl)dibutylamine | 2.90 | | | |
| Resorcinol | 1.25 | 11.8 | 12.6 | 5.2 |
| Resorcinol monoacetate | 1.73 | 11.5 | 15.6 | 5.8 |
| m-Phenylenediamine | 2.00 | 5.8 | 5.9 | 5.3 |
| 1,5-naphthalenediol | 2.00 | 10.1 | 14.5 | 5.9 |
| m-Aminophenol | 1.25 | 15.1 | 14.3 | 5.9 |
| Resorcinol-acetone condensation product | 2.00 | 6.1 | 8.4 | 6.3 |
| N-(2-nitroisobutyl)di-isopropylamine | 2.82 | | | |
| Resorcinol | 1.25 | 7.8 | 8.5 | 3.6 |
| m-Aminophenol | 1.25 | 8.3 | 7.0 | 4.1 |
| Resorcinol monoacetate | 1.72 | 7.8 | 8.7 | 4.8 |

TABLE I—Continued

| Reactants | Parts | Grey cord 250° F. "H" adhesion (lbs.) | | |
|---|---|---|---|---|
| | | Rayon | Nylon | Dacron |
| N-(2-nitroisobutyl)oxazolidine (not dist.) | 1.22 | | | |
| Resorcinol | 1.25 | 16.1 | 17.9 | 6.3 |
| m-Aminophenol | 1.25 | 14.9 | 18.4 | 5.3 |
| Resorcinol monoacetate | 1.72 | 12.2 | 19.0 | 5.6 |
| N-(2-nitroisobutyl)4,4-dimethyloxazolidine (not dist.) | 1.40 | | | |
| Resorcinol | 1.25 | 16.3 | 15.7 | 5.5 |
| m-Aminophenol | 1.25 | 16.9 | 17.3 | 5.9 |
| 1,5-naphthalenediol | 2.00 | 15.5 | 15.6 | 6.8 |
| N-(2-nitroisobutyl)diallylamine | 2.50 | | | |
| Resorcinol | 1.25 | 9.0 | 9.4 | 3.3 |
| m-Aminophenol | 1.25 | 12.5 | 20.1 | 2.8 |
| 1,5-naphthalenediol | 2.00 | 7.5 | 8.5 | 4.1 |
| N-(2-nitroisobutyl)N-methyl-n-butylamine | 2.65 | | | |
| Resorcinol | 1.25 | 9.4 | 10.9 | 4.9 |
| m-Aminophenol | 1.25 | 12.3 | 12.8 | 4.3 |
| Resorcinol monoacetate | 1.72 | 9.8 | 13.5 | 5.1 |
| N-(2-nitroisobutyl)2,6-dimethylmorpholine | 3.02 | | | |
| Resorcinol | 1.25 | 8.1 | 6.7 | 4.8 |
| m-Aminophenol | 1.25 | 13.6 | 14.3 | 3.1 |

Table II illustrates the results obtained with the nitrodiamines having the formula,

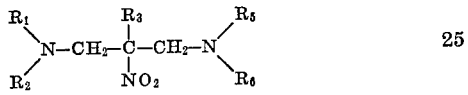

wherein $R_1$, $R_2$, $R_3$, $R_5$ and $R_6$ are as previously defined:

TABLE II

| Reactants | Parts | Grey cord 250° F. "H" adhesion (lbs.) | | |
|---|---|---|---|---|
| | | Rayon | Nylon | Dacron |
| 2-nitro-2-methyl 1,2-di-isopropylaminopropane | 3.10 | | | |
| Resorcinol | 1.25 | 8.6 | 8.9 | 6.2 |
| Resorcinol monoacetate | 1.73 | 6.6 | 5.8 | 5.3 |
| Resorcinol-acetone condensation product | 2.00 | 5.0 | 4.7 | 4.7 |
| 1,5-naphthalenediol | 2.00 | 8.6 | 8.8 | 8.0 |
| m-Aminophenol | 1.25 | 8.8 | 11.3 | 6.4 |
| 4-amino salicylic acid | 1.74 | 4.7 | 5.3 | 3.9 |
| Resorcinol phosphate (monohydrate) | 1.45 | 4.8 | 6.2 | 5.9 |
| O,N diacetyl 3-aminophenol | 2.20 | 4.0 | 4.1 | 4.1 |
| N,N'di(t-butyl) 2-methyl-2-nitro 1,3-propanediamine | 3.20 | | | |
| Resorcinol | 1.25 | 14.6 | 10.6 | 6.8 |
| m-Aminophenol | 1.25 | 14.4 | 11.2 | 7.1 |
| 1,5-naphthalenediol | 2.00 | 11.8 | 8.3 | 7.5 |
| Resorcinol phosphate (monohydrate) | 1.45 | 5.7 | 4.6 | 3.8 |
| N,N'di(t-octyl)2-methyl 2-nitro 1,3-propanediamine (crude) | 5.30 | | | |
| Resorcinol | 1.25 | 12.5 | 11.7 | 5.9 |
| m-Aminophenol | 1.25 | 12.8 | 13.9 | 5.5 |
| Resorcinol monoacetate | 1.72 | 11.2 | 10.2 | 5.9 |
| N,N'diphenyl, 2-methyl, 2-nitro 1,3-propanediamine | 1.80 | | | |
| Resorcinol | 1.25 | 6.7 | 7.3 | 3.4 |
| Resorcinol monoacetate | 1.73 | 6.3 | 5.9 | 3.9 |
| Resorcinol-acetone condensation product | 2.00 | 4.8 | 4.5 | 4.9 |
| N,N,N',N'tetraethyl 2-methyl 2-nitro 1,3-propanediamine | 3.43 | | | |
| Resorcinol | 1.25 | 12.8 | 13.2 | 5.4 |
| m-Aminophenol | 1.25 | 10.7 | 13.5 | 5.2 |
| N,N'di(t-butyl)2-ethyl 2-nitro 1,3-propanediamine (crude) | 3.85 | | | |
| Resorcinol | 1.25 | 11.6 | 12.7 | 5.2 |
| m-Aminophenol | 1.25 | 12.1 | 14.8 | 6.1 |
| Resorcinol monoacetate | 1.72 | 12.2 | 9.9 | 5.3 |
| N,N'di(t-butyl)2-methylol 2-nitro 1,3-propanediamine | 4.00 | | | |
| Resorcinol | 1.25 | 12.6 | 15.5 | 6.7 |
| m-Aminophenol | 1.25 | 10.1 | 10.6 | 6.3 |
| N,N'bis(hydroxy-t-butyl)2-nitro 2-methyl 1,3-propanediamine | 4.10 | | | |
| Resorcinol | 1.25 | 9.2 | 9.4 | 7.3 |
| m-Aminophenol | 1.25 | 6.8 | 6.0 | 4.6 |

Table III shows the results obtained using the bisnitroamines having the formula:

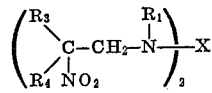

wherein $R_1$, $R_3$ and $R_4$ are as previously defined:

TABLE III

| Reactants | Parts | Grey cord 250° F. "H" adhesion (lbs.) | | |
|---|---|---|---|---|
| | | Rayon | Nylon | Dacron |
| N,N'bis(2-nitroisobutyl)ethylenediamine (crude) | 18.5 | | | |
| Resorcinol | 1.25 | 11.0 | 10.3 | 5.7 |
| m-Aminophenol | 1.25 | 13.2 | 10.8 | 6.2 |
| 1,5-naphthalenediol | 2.00 | 15.4 | 11.3 | 6.9 |
| N,N'bis(2-nitroisobutyl)1,3-propanediamine (crude) | 1.95 | | | |
| Resorcinol | 1.25 | 15.0 | 11.5 | 6.0 |
| m-Aminophenol | 1.25 | 14.1 | 12.6 | 6.0 |
| 1,5-naphthalenediol | 2.00 | 15.5 | 10.9 | 7.2 |
| N,N'bis(2-nitroisobutyl)1,4-butanediamine (crude) | 2.05 | | | |
| Resorcinol | 1.25 | 11.9 | 8.7 | 4.5 |
| m-Aminophenol | 1.25 | 9.7 | 6.6 | 4.9 |
| 1,5-naphthalenediol | 2.00 | 12.8 | 10.9 | 5.1 |
| N,N'bis(2-nitroisobutyl)1,6-hexanediamine (crude) | 2.25 | | | |
| Resorcinol | 1.25 | 11.3 | 7.0 | 3.9 |
| m-Aminophenol | 1.25 | 7.1 | 4.7 | 4.1 |
| 1,5-naphthalenediol | 2.00 | 12.4 | 9.2 | 4.2 |
| N,N'-di(2-nitroisobutyl)1,8-menthanediamine | 2.60 | | | |
| Resorcinol | 1.25 | 10.1 | 8.1 | 6.3 |
| m-Aminophenol | 1.25 | 14.9 | 14.7 | 5.8 |
| A partially reacted resorcinol-formaldehyde resin | 2.00 | 6.5 | 5.6 | 4.0 |
| Bis-(N-(2-nitroisobutyl)methylamino)methane | 1.29 | | | |
| Resorcinol | 1.25 | 15.6 | 15.0 | 5.3 |
| m-Aminophenol | 1.25 | 15.0 | 20.4 | 5.1 |
| Bis-(N(2-nitroisobutyl)ethylamino)methane | 1.41 | | | |
| Resorcinol | 1.25 | 11.1 | 13.2 | 5.5 |
| m-Aminophenol | 1.25 | 14.3 | 18.8 | 5.5 |
| Bis(N(2-nitrosiobutyl)propylamino)methane | 1.55 | | | |
| Resorcinol | 1.25 | 14.3 | 15.8 | 5.7 |
| m-Aminophenol | 1.25 | 14.3 | 19.7 | 5.5 |
| Bis(N(2-nitroisobutyl)isopropylamino)methane (crude) | 1.55 | | | |
| Resorcinol | 1.25 | 11.3 | 18.2 | 6.2 |
| m-Aminophenol | 1.25 | 15.7 | 19.2 | 6.0 |
| Bis(N(2-nitroisobutyl)n-butylamino)methane (crude) | 1.60 | | | |
| Resorcinol | 1.25 | 13.9 | 18.3 | 7.0 |
| Resorcinol monoacetate | 1.72 | 181.8 | 21.2 | 6.4 |
| Bis(N(2-nitroisobutyl)isobutylamino)methane (crude) | 1.68 | | | |
| Resorcinol | 1.25 | 13.6 | 17.8 | 6.9 |
| m-Aminophenol | 1.25 | 11.2 | 20.6 | 4.9 |

The aforesaid data clearly establish the usefulness of the nitroamines of the invention for improving adhesivity of textile cords to rubber. Particularly noteworthy is the consistent and significant improvement of the adhesion to the untreated polyester cord.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In the method of laminating textile material and rubber by contacting a solid vulcanizable rubber composition with a textile material and heating the assembly to vulcanize the rubber, the step which comprises incorporating in the rubber before vulcanization a (1) a nitroamine having the nitro-carbon bonded to an aminomethyl carbon, and (2) resorcinol, m-aminophenol, m-phenylene diamine, resorcinol monoacetate, resorcinol diacetate, 1,5-naphthalenediol, partially reacted resorcinol-formaldehyde resins, condensation products of resorcinol and acetone, or condensation products of resorcinol and acetaldehyde.

2. The method of claim 1 wherein the textile material contains the dried deposit of a rubber latex treating bath.

3. The method of claim 1 wherein the nitroamine has the formula:

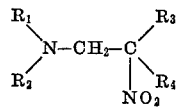

or

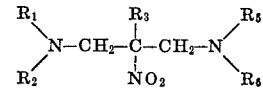

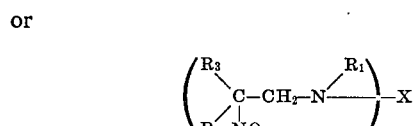

wherein $R_1$ and $R_5$ are hydrogen, an aliphatic or an aromatic group containing from 1 to 18 carbon atoms, $R_2$ and $R_6$ are an aliphatic or an aromatic group containing 1 to 18 carbon atoms, or $R_1$ and $R_2$ or $R_5$ and $R_6$ may form, with the nitrogen atom, a heterocyclic ring; $R_3$ and $R_4$ are hydrogen, an aliphatic group containing from 1 to 18 carbon atoms, or $R_3$ and $R_4$ may form, with the nitro-carbon, a saturated homocyclic or heterocyclic ring; and X is an alkylene group having from 1 to 8 carbon atoms.

4. The method of claim 1 wherein said nitroamine is N,N'-di(t-butyl)2-methyl-2-nitro-1,3-propanediamine.

5. The method of claim 1 wherein said nitroamine is N,N' - di(t-butyl)2-methanol-2-nitro-1,3-propanediamine.

6. The method of claim 1 wherein said nitroamine is N,N'-bis(2-nitroisobutyl)ethylenediamine.

7. The method of claim 1 wherein said nitroamine is N,N'-bis(2-nitroisobutyl)-1,3-propanediamine.

8. The method of claim 1 wherein the textile material is a polyester, nylon or rayon.

9. The product produced by the method of claim 1.

References Cited

UNITED STATES PATENTS

| | | | |
|---|---|---|---|
| 3,262,482 | 7/1966 | Clifton et al. | 156—308X |
| 3,484,337 | 12/1969 | Starita | 156—308X |
| 2,917,421 | 12/1959 | Miller | 161—144X |
| 3,464,875 | 12/1969 | Brooks et al. | 161—144X |
| 3,475,362 | 10/1969 | Romanick et al. | 260—846X |
| 3,476,642 | 11/1969 | Berg et al. | 260—846X |
| 3,483,075 | 12/1969 | Schmitt | 260—846X |

S. J. LECHERT, JR., Primary Examiner

U.S. Cl. X.R.

156—306, 308, 331; 161—227, 231, 239 244, 265; 260—3, 4, 102, 846